May 26, 1959     R. B. IMMEL     2,887,901
ADJUSTABLE-CONTOUR CAM

Filed June 24, 1957     2 Sheets-Sheet 1

WITNESSES

INVENTOR
Ralph B. Immel
BY
ATTORNEY

May 26, 1959     R. B. IMMEL     2,887,901
ADJUSTABLE-CONTOUR CAM
Filed June 24, 1957     2 Sheets-Sheet 2
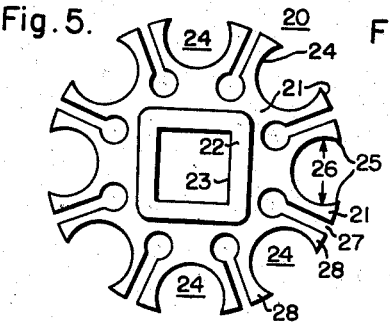
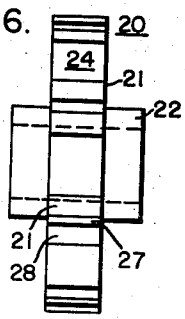
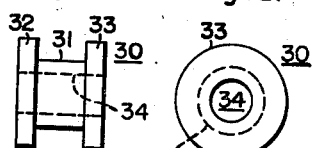
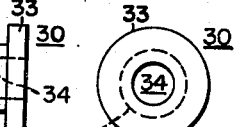
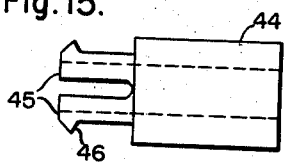
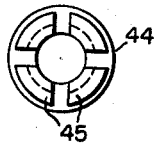
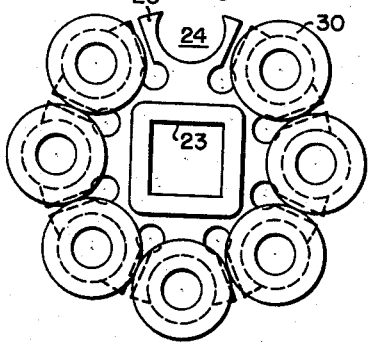
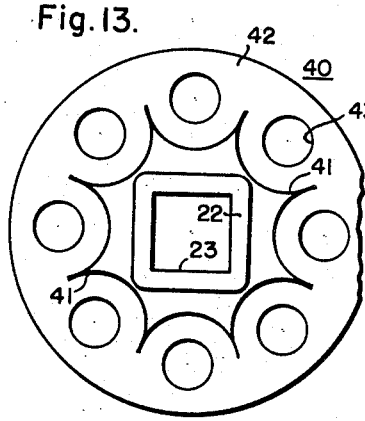
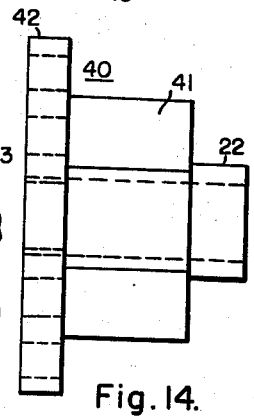
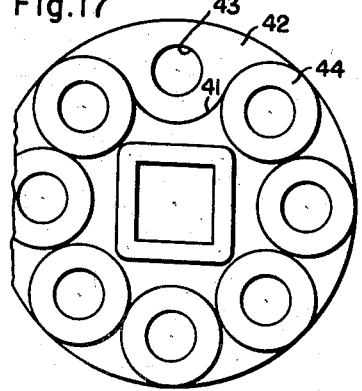
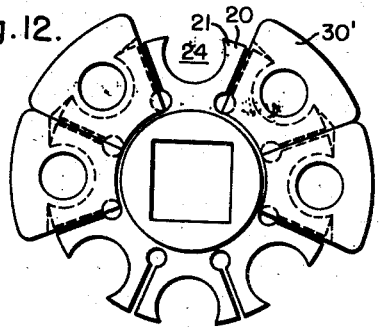
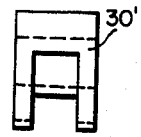
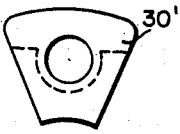

United States Patent Office 2,887,901
Patented May 26, 1959

2,887,901

ADJUSTABLE-CONTOUR CAM

Ralph B. Immel, Williamsville, N.Y., assignor to Westinghouse Electric Corporation, East Pittsburgh, Pa., a corporation of Pennsylvania Application June 24, 1957, Serial No. 667,632

1 Claim. (Cl. 74—568)

My invention relates to an adjustable cam which was primarily designed for an electrical selector-switch, but which is of general utility for use in cam-mechanisms of all kinds, either as a single cam, or on shafts carrying a plurality of cams which are designed to operate during different portions of the rotation of the cam-shaft, either for effecting a plurality of mechanical operations at predetermined times and in a preselected sequence, or for similarly operating a plurality of cam-switches or a plurality of snap-action switches, or for engaging a plurality of electrical contacts after the manner of a drum-controller.

This case is the parent case of my copending divisional application Serial No. 722,780, filed March 20, 1958, and entitled Adjustable Contour Cam.

The purpose of the invention is to provide a novel, compact, low-cost means for changing or adjusting a cam-contour.

A fundamental feature of my adjustable-contour cam is the combination of a basic cylindrical matrix having a plurality of circularly spaced, axially extending openings therein, and a plurality of cam-segment-forming elements which are removably securable in any selected openings.

Exemplary forms of embodiment of my invention are shown on an enlarged scale in the accompanying drawings, wherein:

Figs. 5 and 6 are end and side elevational views of a basic 8-point cam-matrix having a plurality of peripherally disposed, axially extending, open-sided openings therein;

Figs. 7 and 8 are side and end elevational views of one of a plurality of cam-rollers which are removably securable in any selected openings of the matrix of Figs. 5 and 6;

Fig. 9 is an end-elevational view of an assembled 7-point cam using the matrix of Figs. 5 and 6 and seven cam-rollers of Figs. 7 and 8;

Figs. 10 and 11 are side and end elevational views of one of a plurality of cam-segments, which can be used instead of the rollers of Figs. 7 and 8;

Fig. 12 is an end elevational view of an assembled 4-point cam using the matrix of Figs. 5 and 6, and four of the segments of Figs. 10 and 11;

Figs. 13 and 14 are end and side elevational views of a face-plate type of 8-point cam-matrix, having a plurality of circularly spaced, axially extending holes through the face-plate, these holes being adapted to receive the axially removable pronged ends of a plurality of removable cam-rollers, Fig. 13 being a view of the right-hand end of Fig. 14;

Figs. 15 and 16 are side and end views of one of the laterally pronged rollers which are adapted to be used with the matrix of Figs. 13 and 14, Fig. 16 being a view of the left-hand end of Fig. 15; and Fig. 17 is an end view of an assembled 7-point cam using the matrix of Figs. 13 and 14 and seven of the cam-rollers of Figs. 15 and 16.

It will be understood that while my illustrations show a cam-matrix with eight points, the design is flexible and can be made for more or fewer points, as may be desired.

Figure 1:
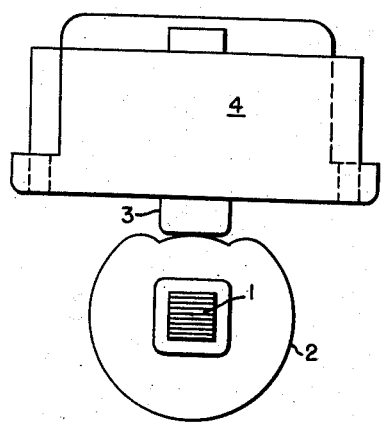
Figure 1 is an elevational view showing an assembly of a cam and a snap-switch which could function as one circuit of a multi-circuit selector-switch in accordance with my invention.
Figure 2:
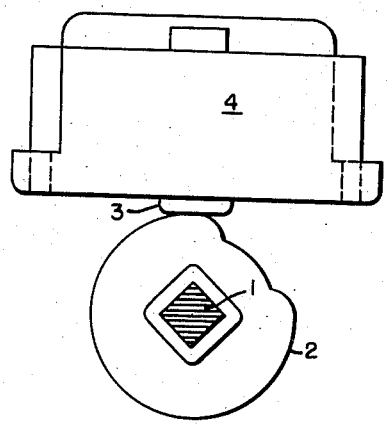
Fig. 2 is a similar view of the same parts, showing the cam rotated 45° to depress the switch-plunger.

Figs. 1 and 2 are transverse or end-elevational views showing a cam-shaft 1 carrying a cam 2 for actuating the plunger 3 of any suitable snap-action switch 4, which may be of any suitable type, such, for example, as that which is shown in Patent No. 2,773,144, granted December 4, 1956 to Martin Wibell and myself.

Figure 3:
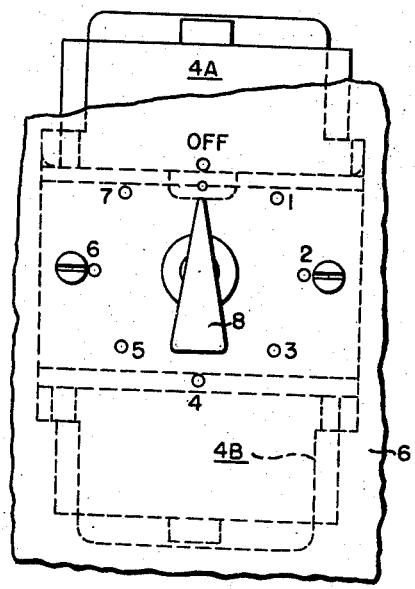
Figs. 3 and 4 are end and side elevational views of a complete selector-switch assembly such as would utilize my invention.
Figure 4:
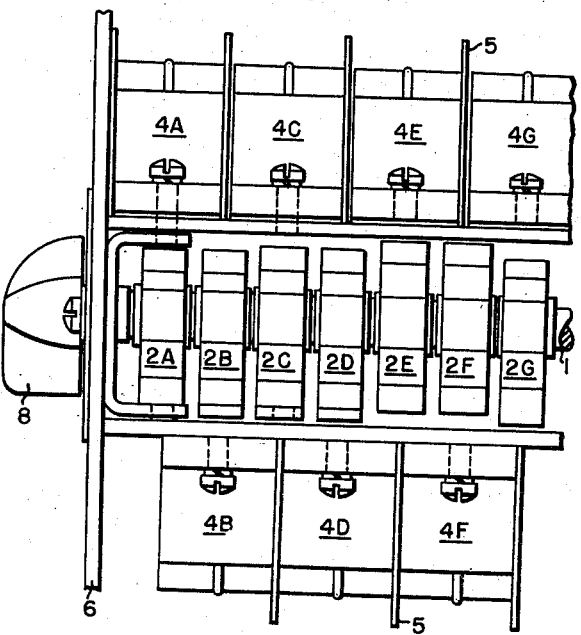

Figs. 3 and 4 show a typical selector-switch assembly in which a cam-shaft 1 carries seven cams 2A to 2G, which operate seven snap-switches 4A to 4G, some of which are mounted above the cams, and some below the cams. The snap-switches are illustrated as being separated by insulating barriers 5. The front panel-plate 6 of the assembly is shown as being marked with an off-position and seven on-positions, the latter being numbered from 1 to 7, to show the positions of a pointer-knob 8 which is mounted on the end of the cam-shaft 1.

My present invention relates more particularly to the construction of one of the cams 2 such as are adapted for use in the switch-assemblies of Figs. 1 to 4, or for any other uses to which cams may be put.

Figs. 5 and 6 show an 8-point cam-matrix 20, which has been designed so that it can be injection-molded in one direction, preferably from nylon, which is low in cost and is also resilient. It comprises a cylindrical member 21 and a hub-portion 22, the latter being illustrated as being provided with a square central opening 23 (to give a concrete example) for assembly on a square shaft (not shown in Figs. 5 and 6). The cylindrical part 21 of this matrix is provided with eight, or any other desired number of, spaced, peripherally disposed, axially extending, open-sided openings 24. Each of these openings 24 is open along one side, at the periphery of the matrix, as shown at 25 and the circumferential width of the open side 25 of each of the axially extending open-sided openings 24 is somewhat constricted, as compared to the circumferential width or extent of the axially extending opening 24 at a point 26 which is immediately back from the periphery of the matrix 21. The cylindrical portion 21 of the matrix 20 is provided with a plurality of axially extending slots 27, extending radially inwardly from the periphery of said matrix, at points between successive axially extending openings 24, so as to provide some resilience to the lateral side-walls 28 of said axially extending, open-sided openings 24.

Figs. 7 and 8 show one of a plurality of cam-rollers 30, which are used for the purpose of forming cam-segments, to be removably mounted in any selected openings 24 of the cylindrical matrix 21 of Figs. 5 and 6. Each roller 30 is shown as comprising a cylindrical roller-proper 31, having integral flanges 32 and 33 on its respective ends. The cylindrical roller-portion 31 is shown as being of about the same size and shape as the open-sided openings 24 in the matrix 21. Each roller 31 can be inserted in its open-sided opening 24 by simply pressing it radially inwardly, thereby temporarily spreading apart the resilient lateral side-walls 28 of said open-sided opening, far enough to permit said roller-portion 31 to be forced radially into place, after which the resilient lateral side-walls 28 spring back into place, removably retaining the roller 31 in position. To facilitate the insertion and removal of the roller-members 31, in one of the open-sided openings 24 of the matrix 21, the roller 30 is provided with a central hole 34, through which a tool (not shown) may be inserted, for convenience in applying the necessary radial pressures.

Many different cam-contours may be provided, by using as many or as few of the rollers 30 as may be desirable, and by making the proper choice of the holes 24 in which the rollers will be placed, in order to produce the desired cam-contour. One such assembly is shown, by way of illustration, in Fig. 9. The cam-assembly of Fig. 9 can be used to operate a snap-switch plunger 3, such as is shown in Figs. 1 and 2, and this plunger may be wide enough so that it will ride over the peripheral space between two adjacent rollers 30, so that two adjacent rollers 30 will serve, to all effects and purposes, as a single elevated cam-surface. Or, if desired, a narrower snap-switch plunger 3 could be used, which could be sufficiently narrow to ride down in the depressions between the successive rollers 30 in Fig. 9.

As an alternative to the use of rollers 30, which serve as cam-segment-forming elements, these elements might be formed with segmental-shaped outer peripheral surfaces, as illustrated by the cam-segments 30' of Figs. 10, 11 and 12. It will be noted that the outer periphery of two or more segments which are assembled in adjacent holes 24 is an almost continuous circular section. This feature is desirable, when a small snap-switch plunger 3 (Figs. 1 and 2) is used, so that the plunger cannot drop into a depression between two adjacent segments 30' of Fig. 12, as might occur between two adjacent rollers 30 of Fig. 9. Fig. 12 illustrates a cam-contour which is different from that which is shown in Fig. 9.

Figs. 13 to 17 show a different modification of an "add-a-roller" cam-assembly. This assembly requires a lateral space, rather than a radial space, for the insertion and removal of the rollers, as will be apparent as the description thereof proceeds.

Thus Figs. 13 and 14 show a basic matrix 40 having an intermediate-sized hub-member 41 and a cylindrical face-plate 42 of a larger diameter than said hub-member 41, at one end of said hub-member 41. The cylindrical face-plate 42 of the basic matrix 40 of Figs. 13 and 14 has eight, or any other desired number of circularly spaced, axially extending holes 43 therethrough.

Figs. 15 and 16 show one of a plurality of cam-segment-forming rollers 44, which are adapted for use with the matrix 40 of Figs. 13 and 14. As illustrated, each roller 44 has, at one end, a plurality of resilient, laterally extending prongs 45, which are adapted to extend through, and to removably engage, one of the holes 43 in the cylindrical matrix 42 of Figs. 13 and 14. The engagement of the prongs 45 within the holes 43 is of such a gripping nature as to removably retain the roller 44 in place, with its pronged end abutting against the side of the face-plate 42 of the matrix. This gripping engagement of the plungers in the holes may be of any suitable nature, such as a simple frictional engagement, or a more positive barb-ended engagement, such as can be provided by the barbed ends 46 of the prongs 45, as shown in Fig. 15. In this manner, the rollers 44, such as are shown in Figs. 15 and 16, are removably securable in any selected holes 43 of the matrix 40—42 of Figs. 13 and 14.

In the matrix-design which is shown in Figs. 13 and 17, the intermediate-sized hub-member 41 has a peripheral surface 41 which forms seats for taking the radial back-thrusts of the rollers 44 or other cam-segment-forming elements, so that there will be no radial bending-strain which might tend to pull the resilient prongs 45 out of the holes 43.

In the preferred form of construction of my invention, all of the separate parts of my adjustable-contour cam are preferably molded from nylon, including the matrix 20 or 40, and the plurality of cam-segment-forming elements 30, 30' or 44. Nylon is preferable because of its low cost, its resilient nature, its low coefficient of friction, and the facility with which it can be injection-molded. When the cam-assembly is used as a part of an electrical switching-assembly, the insulating property of nylon is also an advantage. However, my invention is not limited to nylon, or to any other plastic material, or to an insulating material. It is quite conceivable that the segment-forming members 30, 30' or 44 could be made of a conducting material, and could complete an electric circuit by making connection with one or more stationary brushes or contact-members. The matrix also could conceivably be fabricated from a metallic spring-material.

In general, while I have illustrated and described my preferred constructions, in several forms of embodiment, I wish it to be understood that my invention, in its more basic principles, is not limited to these details.

I claim as my invention:

An adjustable-contour cam, comprising a basic cylindrical matrix of resilient material, said matrix having a plurality of spaced, peripherally disposed, axially extending, open-sided openings therein, each axially extending open-sided opening being open along one side, at the periphery of said matrix, and each axially extending open-sided opening being somewhat constricted in the circumferential width of its open side, as compared to the circumferential width of the axially extending opening at a point immediately back from the periphery of said matrix, said matrix having axially extending slots, extending radially inwardly from the periphery of said matrix, at points between successive axially extending openings, whereby to provide some resilience to the lateral sidewalls of said axially extending, open-sided openings, and a plurality of cam-segment-forming elements, each cam-segment-forming element having a matrix-engaging portion having a shape suitable for fitting within one of the open-sided openings of the matrix after the resilient lateral side-walls of said open-sided opening have been temporarily spread apart enough to permit said cam-segment-forming element to be forced radially into place, whereby said plurality of cam-segment-forming elements are removably securable in any selected openings.

References Cited in the file of this patent

UNITED STATES PATENTS

| | | |
|---|---|---|
| 2,163,864 | Bissell | June 27, 1939 |
| 2,418,757 | Collins | Apr. 8, 1947 |
| 2,782,654 | Reinhold | Feb. 26, 1957 |